(12) United States Patent
Murakami

(10) Patent No.: US 7,724,418 B2
(45) Date of Patent: May 25, 2010

(54) ELECTROPHORETIC DISPLAY MEDIUM AND METHOD OF FORMING THE SAME

(75) Inventor: Kenichi Murakami, Kuwana (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 172 days.

(21) Appl. No.: 12/046,331

(22) Filed: Mar. 11, 2008

(65) Prior Publication Data
US 2008/0218845 A1 Sep. 11, 2008

Related U.S. Application Data

(63) Continuation-in-part of application No. PCT/JP2006/316011, filed on Aug. 14, 2006.

(30) Foreign Application Priority Data

Sep. 21, 2005 (JP) .............................. 2005-273575

(51) Int. Cl.
*G02B 26/00* (2006.01)
*G03F 1/00* (2006.01)
(52) U.S. Cl. .............................. 359/296; 430/5; 430/321
(58) Field of Classification Search ................. 359/296; 430/5, 24, 32, 34, 38, 396, 269, 320, 321, 430/322, 327; 345/107, 105; 204/450, 600
See application file for complete search history.

(56) References Cited

U.S. PATENT DOCUMENTS

| | | | |
|---|---|---|---|
| 6,441,881 B1 * | 8/2002 | Enomoto et al. ............. | 349/156 |
| 6,525,865 B2 * | 2/2003 | Katase ........................ | 359/296 |
| 2003/0032713 A1 | 2/2003 | Penterman et al. | |
| 2005/0045478 A1 | 3/2005 | Liao et al. | |

FOREIGN PATENT DOCUMENTS

| | | |
|---|---|---|
| EP | 1193487 A1 | 4/2002 |
| JP | 56-108171 U | 8/1981 |

(Continued)

OTHER PUBLICATIONS

International Search Report, International Preliminary Report on Patentability, Related Patent Application No. PCT/JP2006/316011 mailed Sep. 12, 2006.

(Continued)

*Primary Examiner*—Ricky L Mack
*Assistant Examiner*—Tuyen Q Tra
(74) *Attorney, Agent, or Firm*—Baker Botts L.L.P.

(57) ABSTRACT

A method of accurately forming lower partitions than spacers on a substrate in an electrophoretic medium includes a first resist application step where a first negative resist is applied on the first substrate, a first exposure step where the first negative resist is exposed to light through a first mask having an aperture pattern for exposing a pattern of the partition to light, a second resist application step where a second negative resist is applied on the first negative resist, a second exposure step where the second negative resist and the first negative resist are exposed to light through a second mask having an aperture pattern for exposing a pattern of the spacer to light, and a development step where the first negative resist and the second negative resist are developed.

6 Claims, 11 Drawing Sheets

FOREIGN PATENT DOCUMENTS

| | | |
|---|---|---|
| JP | 2000199813 A | 7/2000 |
| JP | 2003241234 A | 8/2003 |
| JP | 2003-322975 A | 11/2003 |
| JP | 2004515632 A | 5/2004 |
| JP | 200578053 A | 3/2005 |
| JP | 2005221520 A | 8/2005 |
| TW | 589506 B | 6/2004 |
| WO | 0248281 A1 | 6/2002 |

OTHER PUBLICATIONS

European Patent Office, Supplementary European Search Report in counterpart Patent Application No. EP 06796401, mailed Jul. 31, 2009.

* cited by examiner

ELECTROPHORETIC DISPLAY MEDIUM AND METHOD OF FORMING THE SAME

CROSS REFERENCE TO RELATED APPLICATION

This application claims priority from Japanese Patent Application No. 2005-273575 filed Sep. 21, 2005. This application is also a continuation-in-part of International Application No. PCT/JP2006/316011 filed Aug. 14, 2006 in Japan Patent Office as a Receiving Office. The contents of both applications are incorporated herein by reference.

TECHNICAL FIELD

The present invention relates to an electrophoretic display medium, and a method of forming a partition and a spacer on a first substrate in the electrophoretic display medium.

BACKGROUND

A conventional electrophoretic display medium well known in the art is provided with a dispersion medium injected between pair of substrates with positive or negative charged particles dispersed therein so as to display an image. In such an electrophoretic display medium, a pair of substrates is disposed to face each other. With the application of an electric field, charged particles migrate between the substrates, thereby displaying an image.

There provided in such an electrophoretic display medium are a partition that partitions the region between the substrates, and a spacer disposed on the outer circumference of a substrate for defining the distance between the substrates.

Patent document 1 discloses such an electrophoretic display medium in which a spacer and a partition are disposed between substrates.

Patent Document 1: Japanese Utility Model Application Publication No. S56-108171

In order to manufacture such an electrophoretic display medium having a partition and a spacer, following methods are available. One method is to form a spacer on an outer circumference of a substrate, followed by forming a partition in a region inside the spacer formed on the outer circumference. The other method is to form a partition on a substrate, followed by forming a spacer on an outer circumference of the substrate so as to enclose the partition. In these methods, an adhesive is applied between the partition and the substrate so that the partition and the substrate are fixed together persistently. In order to fix the spacer and the substrate together persistently, an adhesive is also applied between the spacer and the substrate.

However, in such an electrophoretic display medium, if there is a demand that the partition be lower than the spacer, it is difficult to make a level difference between the partition and the spacer accurately in the above method where the partition and the spacer formed separately are mounted on the substrate. This is because of the difficulty in having an accurate control over the adhesive thickness between the partition and the substrate as well as between the spacer and the substrate.

The present invention is made to solve the above problem, and it is an object of the present invention to provide a method of allowing a partition and a spacer of different heights to be formed on a substrate accurately, and an electrophoretic display medium where a partition and a spacer of different heights are formed accurately.

SUMMARY

It is an object of the present invention to provide an electrophoretic display medium with partitions and spacers of different heights formed on a substrate therein, and a method of forming partitions and spacers of different heights accurately on a substrate in the electrophoretic display medium.

According to one aspect of the invention, a method of forming an electrophoretic display medium includes a first resist application step wherein a first negative resist is applied on a first substrate, a first exposure step wherein the first negative resist is exposed to light through a first mask having an aperture pattern through which a pattern of a partition is exposed to light, a second resist application step wherein a second negative resist is applied on the first negative resist, a second exposure step wherein the second negative resist and the first negative resist are exposed to light through a second mask having an aperture pattern through which a pattern of a spacer is exposed to light, and a development step wherein the first negative resist and the second negative resist are developed to form the partition and the spacer on the first substrate. Subsequently, disposed are the first substrate and a second substrate to confront with each other with the partition and the spacer interposed between the first substrate and the second substrate. The partition partitions a region between the first substrate and the second substrate, while the spacer defines a distance therebetween. Finally, a dispersion medium with charged particles dispersed therein is injected between the first substrate and the second substrate.

According to another aspect of the invention, a method of forming an electrophoretic display medium includes a first resist application step wherein a first negative resist is applied on the first substrate, a first exposure step wherein the first negative resist is exposed to light through a first mask having an aperture pattern through which patterns of a partition and a spacer are exposed to light, second resist application step wherein a second negative resist is applied on the first negative resist, a second exposure step wherein the second negative resist is exposed to light through a second mask having an aperture pattern through which a pattern of the spacer is exposed to light, and a development step wherein the first negative resist and the second negative resist are developed to form the partition and the spacer on the first substrate. Subsequently, disposed are the first substrate and a second substrate to confront with each other with the partition and the spacer interposed between the first substrate and the second substrate. The partition partitions a region between the first substrate and the second substrate, while the spacer defines a distance therebetween. Finally, a dispersion medium with charged particles dispersed therein is injected between the first substrate and the second substrate.

According to further aspect of the present invention, an electrophoretic display medium includes a first substrate and a second substrate facing each other, a dispersion medium with charged particles dispersed therein injected between the first substrate and the second substrate, a partition that partitions a region between the first substrate and the second substrate, and a spacer disposed between the first substrate and the second substrate for defining a distance therebetween. The partition and the spacer are formed on the first substrate by a method including a first resist application step wherein a first negative resist is applied on the first substrate, a first exposure step wherein the first negative resist is exposed to light through a first mask having an aperture pattern through which a pattern of the partition is exposed to light, a second resist application step wherein a second negative resist is applied on the first negative resist, a second exposure step wherein the second negative resist and the first negative resist are exposed to light through a second mask having an aperture pattern through which a pattern of the spacer is exposed to light, and a development step wherein the first negative resist and the second negative resist are developed.

According to further aspect of the invention, an electrophoretic display medium includes a first substrate and a second substrate facing each other, a dispersion medium with charged particles dispersed therein injected between the first substrate and the second substrate, a partition that partitions a region between the first substrate and the second substrate, and a spacer disposed between the first substrate and the second substrate for defining a distance therebetween. The partition and the spacer are formed on the first substrate according to a method including a first resist application step wherein a first negative resist is applied on the first substrate, a first exposure step wherein the first negative resist is exposed to light through a first mask having an aperture pattern through which patterns of the partition and the spacer are exposed to light, a second resist application step wherein the second negative resist is applied on the first negative resist, a second exposure step wherein the second negative resist is exposed to light through a second mask having an aperture pattern through which a pattern of the spacer is exposed to light, and a development step wherein the first negative resist and the second negative resist are developed.

DETAILED DESCRIPTION

Hereinafter, embodiments of the present invention will be described with reference to the accompanying drawings.

First, a description is given for an electrophoretic display medium 10 having a partition 13 and a spacer 14, formed in a method of forming a partition and a spacer of an electrophoretic display medium on a substrate, as the embodiments of the present invention.

Figure 1:
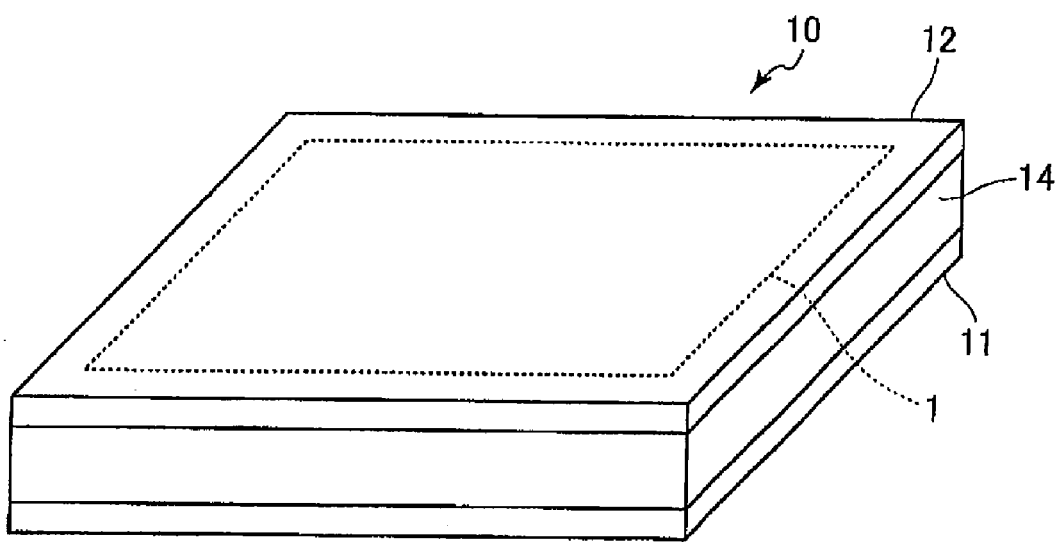
FIG. 1 is a perspective view showing the appearance of an electrophoretic display medium.

FIG. 1 is a perspective view showing the appearance of the electrophoretic display medium 10. As shown in FIG. 1, in the electrophoretic display medium 10, provided are a first substrate 11 formed of polyethylene terephthalate (PET) into a rectangular shape, and a second substrate 12 formed of polyethylene terephthalate into a rectangular shape in the same manner, so as to face each other. Note that the second substrate 12 is formed of transparent polyethylene terephthalate; the top face of the second substrate 12 is designed to display an image. In the electrophoretic display medium 10, the top face of the second substrate 12 corresponds to a display surface. A display region 1, which is a central portion of the display surface of the second substrate 12, displays an image.

A spacer 14 is formed on the outer circumference of the region confined between the first substrate 11 and the second substrate 12. The spacer 14 defines the distance between the first substrate 11 and the second substrate 12. The spacer 14 also seals and prevents a dispersion medium 16 and charged particles 15 (to be described later) injected between the first substrate 11 and the second substrate 12 from leaking to outside.

Figure 2:
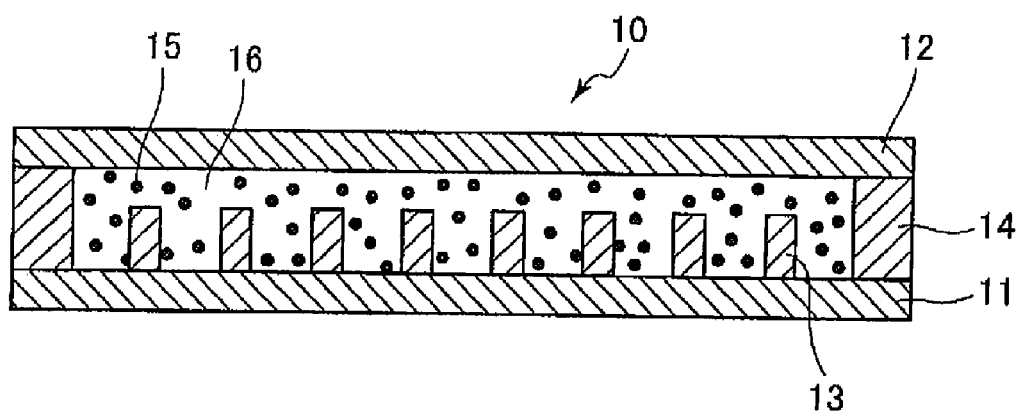
FIG. 2 illustrates the internal configuration of the electrophoretic display medium.

A description is given for the internal configuration of the electrophoretic display medium 10 with reference to FIG. 2. FIG. 2 illustrates the internal configuration of the electrophoretic display medium 10. As shown in FIG. 2, injected between the first substrate 11 and the second substrate 12 is the dispersion medium 16 wherein black charged particles 15 having a negative polarity are dispersed. The dispersion medium 16 is dyed in white. The average diameter of the charged particles 15 is 3 μm.

The partition 13 formed in the method according to the present invention is provided on the first substrate 11. The partition 13 is formed so as to prevent the charged particles 15 from traveling in a horizontal direction. This means that the partition 13 prevents uneven distribution of the charged particles 15 between the first substrate 11 and the second substrate 12 relative to a horizontal direction. The charged particles 15, therefore, are provided at an even density in a horizontal direction. Now that uneven distribution of the charged particles 15 is prevented between the substrates, the charged particles 15 are dispersed evenly between the substrates relative to a horizontal direction, thereby preventing unevenness from appearing on a displayed image.

Figure 3:
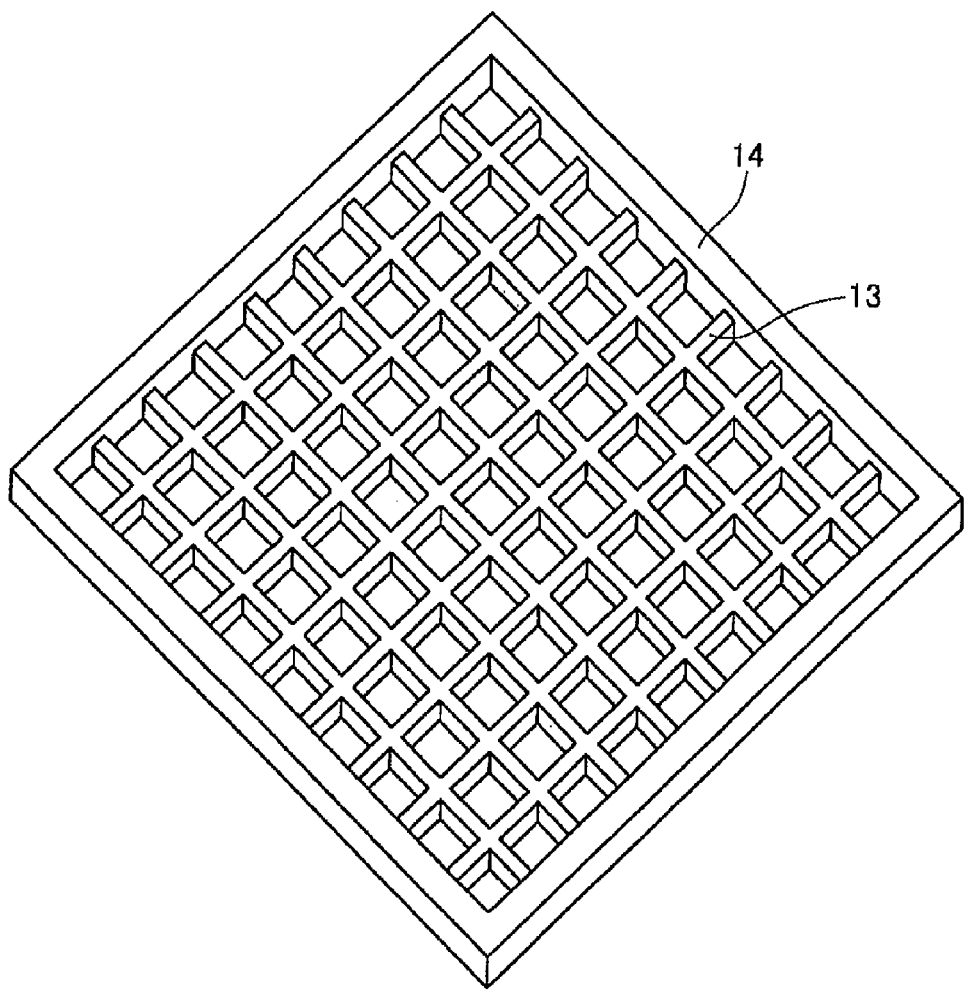
FIG. 3 is a perspective view showing a partition and a spacer.

FIG. 3 is a perspective view showing the partition 13 and the spacer 14. The partition 13 and the spacer 14 are integrally formed of epoxy resin in a method to be described later. The partition 13 is formed like a grid pattern when viewed from above. The spacer 14 has a rectangular shape so as to enclose the grid-like partition 13.

As will be described later, since the height of the partition 13 is formed lower than the height of the spacer 14, the top face of the partition 13 does not make contact with the second substrate 12. Specifically, the partition 13 is 20 μm high, and the spacer 14 is 25 μm high. This means that a gap of 5 μm is left between the upper surface of the partition 13 and the undersurface of the second substrate 12.

Figure 4:
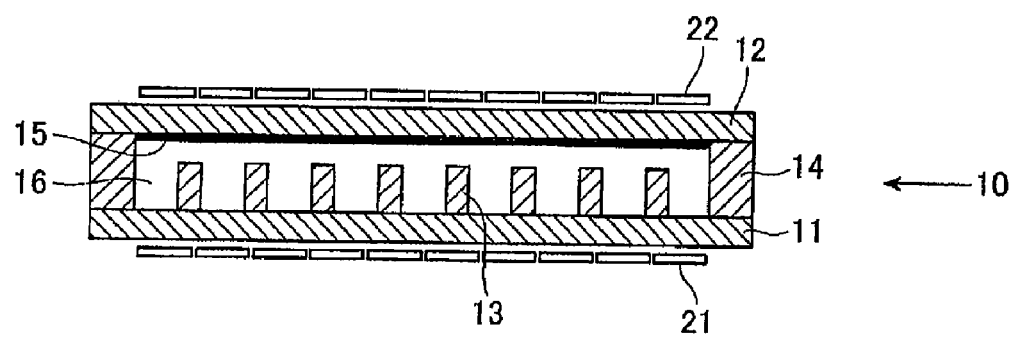
FIG. 4 shows the electrophoretic display medium in a state that black color is displayed across a display region.

Next, a description is given for display switching operation in the electrophoretic display medium 10. In the electrophoretic display medium 10, neither the first substrate 11 nor the second substrate 12 directly includes an electrode for applying an electric field to the charged particles 15. Accordingly, in order to perform a display switching operation, as shown in FIG. 4, electrodes 21 and electrodes 22 are externally arranged so as to apply an electric field to the charged particles between the substrates. The electrodes 21 are arranged on the first substrate 11 side, while the electrodes 22 are arranged on the second substrate 12 side. In order to make the description simpler, in this case, the assumption is made that a pair of electrode 21 and electrode 22 is provided for each pixel. Accordingly, a voltage applied to the pair of electrode 21 and electrode 22 is controlled so that display switching is controlled for each pixel.

FIG. 4 shows a state that the black color is displayed across the display region 1 shown in FIG. 1. In this case, a voltage of 0V is applied to all the electrodes 21, and a voltage of 50V is applied to all the electrodes 22. As a consequence, the negatively charged particles 15 migrate to the second substrate 12 side. The black charged particles 15 are then adhered to the second substrate 12. The black color is thus displayed across the display region 1.

In the case described above, a voltage is applied to both of the electrodes 21 and the electrodes 22 in order to move the charged particles 15. Further, even when the voltages applied to both electrodes could drop down to 0V, the state that the charged particles 15 are being adhered to the second substrate 12 is maintained.

Figure 5:
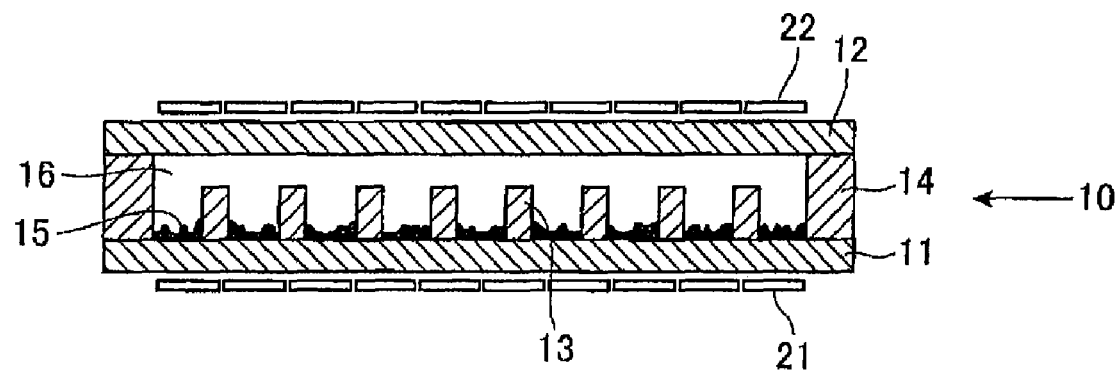
FIG. 5 shows the electrophoretic display medium in a state that white color is displayed across a display region.

FIG. 5 shows a state that the white color is displayed across the display region 1. In this case, a voltage of 50V is applied to all the electrodes 21, and a voltage of 0V is applied to all the electrodes 22. The negatively charged particles 15 migrate to the first substrate 11 side. The black charged particles 15 are then adhered to the first substrate 11, thereby leaving only the white dispersion medium 16 on the second substrate 12 side. The white color is thus displayed across the display region 1.

As has been described above, a gap of 5 μm is left between the upper surface of the partition 13 and the undersurface of the second substrate 12. The average diameter of the charged particles 15 is 3 μm. Therefore, as shown in FIG. 4, when the black color is displayed across the display region 1, the charged particles 15 can penetrate into the gap between the upper surface of the partition 13 and the undersurface of the second substrate 12. The black color is thus displayed across the display region 1.

Figure 6:
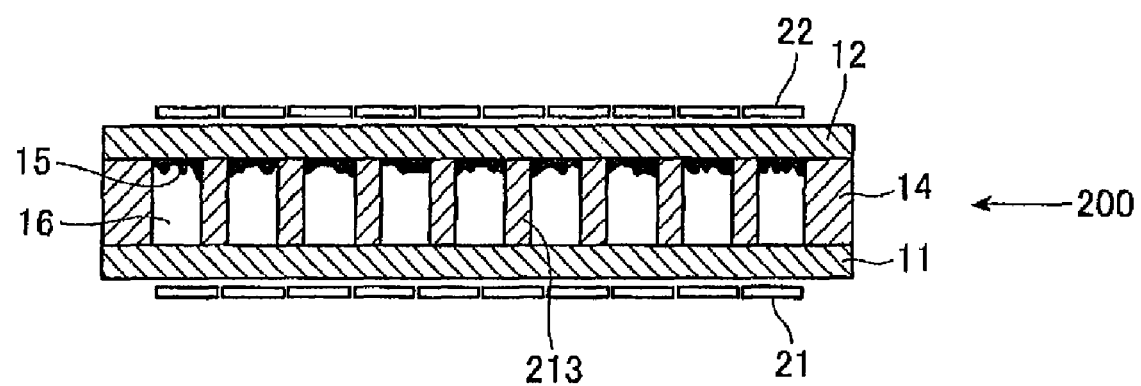
FIG. 6 illustrates an electrophoretic display medium having a partition whose top face is in contact with an underside portion of a second substrate.

On the other hand, as shown in FIG. 6, in an electrophoretic display medium 200 having a partition 213 whose top surface is in contact with the undersurface of the second substrate 12, there is no gap left between the upper surface of the partition 213 and the undersurface of the second substrate 12. The display region 1, therefore, necessarily has to have an area where the black color cannot be displayed.

As has been described above, by forming the height of the partition 13 lower than the height of the spacer 14, the display region 1 is effectively utilized in the electrophoretic display medium 10.

Next, a description is given for a method of forming the partition 13 and the spacer 14 on the first substrate 11 in the electrophoretic display medium 10, as a first embodiment of the present invention.

Figure 7A:
FIG. 7(a) to 7(g) illustrate each step in the method of forming the partition and the spacer of the electrophoretic display medium on a first substrate, as a first embodiment of the present invention.
Figure 7D:
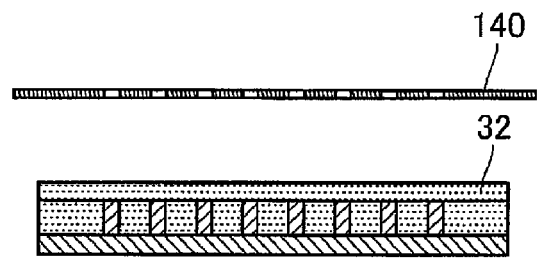
Figure 7B:
Figure 7E:
Figure 7C:
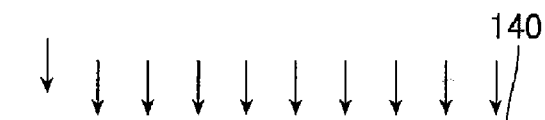
Figure 7F:
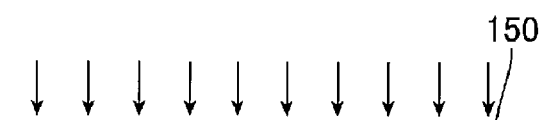
Figure 7G:
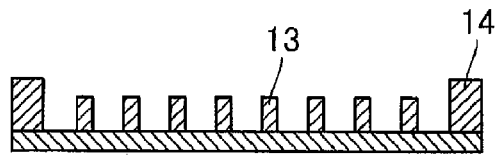

FIG. 7(a) to 7(g) illustrate each step in the method of forming the partition 13 and the spacer 14 on the first substrate 11 in the electrophoretic display medium 10, as the first embodiment of the present invention. FIG. 7(a) illustrates a first resist application step according to the present invention; FIG. 7(b) illustrates a first mask positioning step according to the present invention; FIG. 7(c) illustrates a first exposure step according to the present invention; FIG. 7(d) illustrates a second resist application step according to the present invention; FIG. 7(e) illustrates a second mask positioning step according to the present invention; FIG. 7(f) illustrates a second exposure step according to the present invention; and FIG. 7(g) illustrates a development step according to the present invention.

First, referring to FIG. 7(a), in the first resist application step, a first negative resist 31, which is a negative-type resist made of a resin, a sensitizer, and a solvent, is applied on the first substrate 11. The first negative resist 31 is applied on the first substrate 11 at a thickness of 20 μm by the spin-coating method. The first negative resist 31 is then soft-baked so that the solvent in the first negative resist is driven off until the first negative resist 31 becomes not sticky.

Next, referring to FIG. 7(b), in the first mask positioning step, a first mask 140 is positioned over the first substrate 11 in a state that the first mask 140 is distant from the first negative resist 31.

Figure 8:
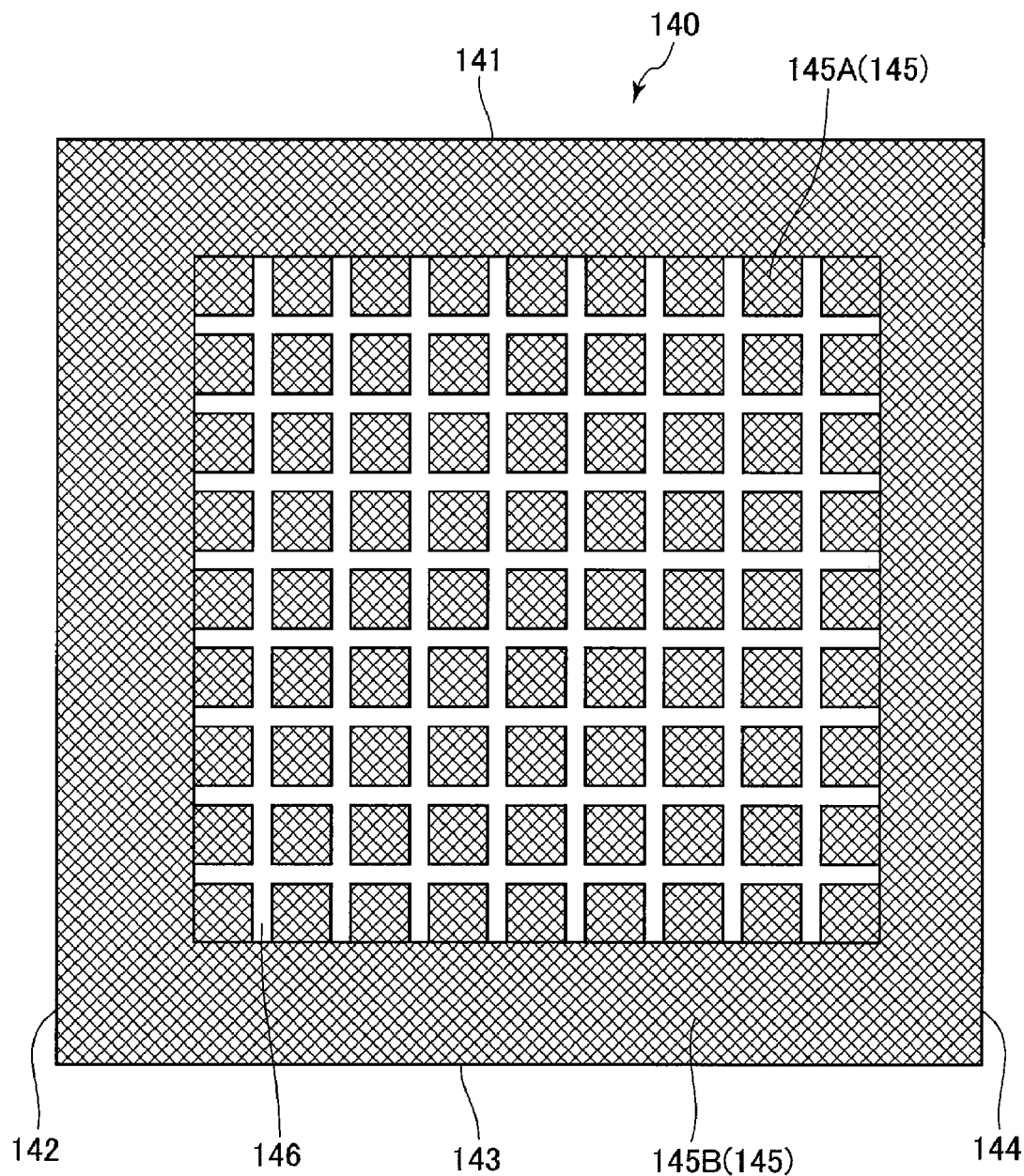
FIG. 8 is an elevation view showing a first mask.

Here, a description is given for the first mask 140 with reference to FIG. 8. FIG. 8 is an elevation view of the first mask 140. The first mask 140 is rectangular, having side portions 141 to 144. For the first mask 140, printing is made on a transparent glass plate with a light-shielding agent 145 (145A and 145B) so that a lattice-shaped aperture pattern 146 is formed thereon as shown in FIG. 8. Specifically, the aperture pattern 146 is a region in which no printing is made with the light-shielding agent on the transparent glass substrate. More specifically, the light-shielding agent 145 includes a substantially square light-shielding part 145A, and a light-shielding part 145B printed along the side portions 141 to 144. Each side of the light-shielding part 145A is either parallel or orthogonal to the side portions 141 to 144. A plurality of the light-shielding parts 145A is provided at regular intervals along with up-down and right-left directions. The light-shielding part 145B is printed along and in parallel with the side portions 141 to 144, ranging from the side portions 141 to 144 toward the center of the first mask 140 at a predetermined width.

Next, referring to FIG. 7(c), in the first exposure step, the first negative resist 31 is exposed to light through the above-mentioned first mask 140. This solidifies the resin of the portion exposed to light in the first negative resist because of the action of the sensitizer. In this case, the amount of the light exposure is equal to 500 mJ/cm$^2$. In order to smooth the sides of the portion solidified by exposure, a post exposure bake (PEB) is performed on the first negative resist 31. A latent image 63 having the same shape as the partition 13 is then formed. The latent image 63 contains a high proportion of solvent. The solvent is further driven off by post bake (to be described later), thereby completing the partition 13.

Next, referring to FIG. 7(d), in the second resist application step, a second negative resist 32, which is a negative-type resist, is applied on the first negative resist 31. The second negative resist 32 is applied on the first negative resist 31 at a thickness of 5 μm by the spin-coating method. The second negative resist 32 applied on the first negative resist 31 is then soft-baked until the second negative resist 32 becomes not sticky.

Next, referring to FIG. 7(e), in the second mask positioning step, the first mask 140 is removed from the first substrate 11. A second mask 150 is positioned over the first substrate 11 in a state that the second mask 150 is distant from the second negative resist 32.

Figure 9:
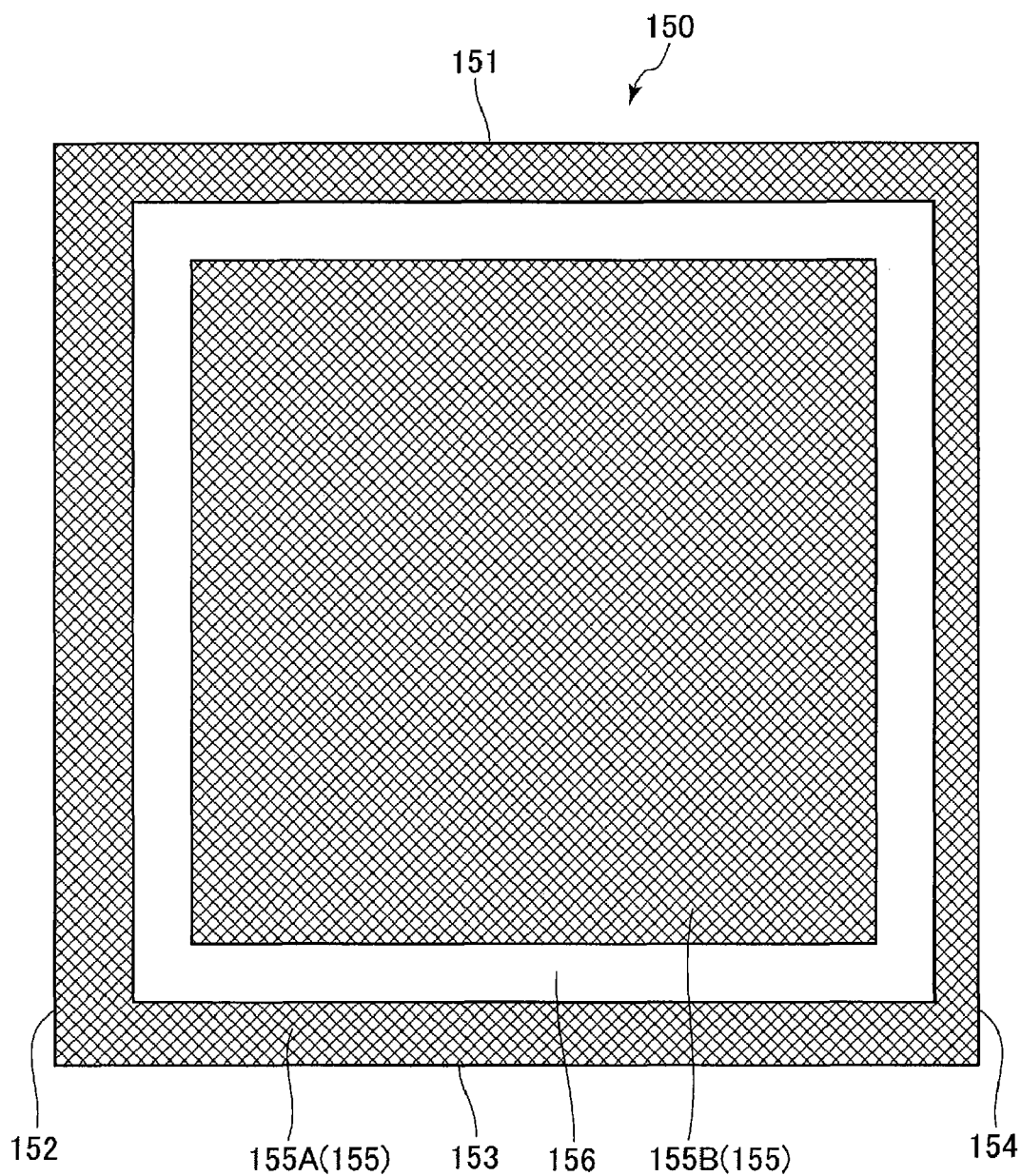
FIG. 9 is an elevation view showing a second mask.

Here, a description is given for the second mask 150 with reference to FIG. 9. FIG. 9 is an elevation view of the second mask 150. The second mask 150 is rectangular, having side portions 151 to 154. For the second mask 150, printing is made on a transparent glass plate with a light-shielding agent 155 (155A, 155B) so that an aperture pattern 156 is formed thereon as shown in FIG. 9. Specifically, the aperture pattern 156 is a region in which no printing is made with the light-shielding agent on the transparent glass substrate. More specifically, the light-shielding agent 155 includes a substantially square light-shielding part 155B, and a light-shielding part 155A printed along the side portions 151 to 154. Each side of the light-shielding part 155B is parallel or orthogonal to the side portions 151 to 154. The light-shielding part 155A is printed along and in parallel with the side portions 151 to 154, ranging from the side portions 151 to 154 toward the center of the second mask 150 at a predetermined width.

Next, referring to FIG. 7(f) in the second exposure step, the second negative resist 32 and the first negative resist 31 are exposed to light through the above-mentioned second mask 150. In this case, the amount of the light exposure is equal to 750 mJ/cm$^2$. A post exposure bake (PEB) is then performed on the second negative resist 32 and the first negative resist 31 so that a latent image 64 having the same shape as the spacer 14 is formed.

Next, referring to FIG. 7(g), in the development step, a development is performed, with a developer, on the first negative resist 31 and the second negative resist 32, where the latent image 63 and the latent image 64 have been formed, so that a non-solidified portion (non-exposed portion) is removed. After that, the latent image 63 and the latent image 64 left on the first substrate 11 are sintered by post bake, thereby forming the partition 13 and the spacer 14 on the first substrate 11.

According to the first embodiment, the partition 13 and the spacer 14 are formed integrally on the first substrate 11 by photo lithography, thereby allowing the partition 13 and the spacer 14 of different heights to be formed accurately.

According to the first embodiment, the amount of the light exposure 750 mJ/cm$^2$ in the second exposure step is greater than the amount of the light exposure 500 mJ/cm$^2$ in the first exposure step. Therefore, the latent image 64 is formed on the layers of the second and first negative resists without failure. Specifically, an adjustment of the amount of the light exposure is made by making the exposure duration longer in the second exposure step than in the first exposure step, with the same light source. In this case, the amount of the light exposure 500 mJ/cm$^2$ is required for solidifying a negative resist of 20 μm thickness, and the amount of the light exposure 750 mJ/cm$^2$ is required for solidifying a negative resist of 25 μm thickness. Therefore, since the amount of the light exposure in the first exposure step could be greater than 500 mJ/cm$^2$, the amount of the light exposure could be performed at 750 mJ/cm$^2$ in the first exposure step and at 750 mJ/cm$^2$ in the second exposure step.

Next, a description is given for a method of forming the partition 13 and the spacer 14 on the first substrate 11 in the electrophoretic display medium 10, as a second embodiment of the present invention.

Figure 10A:
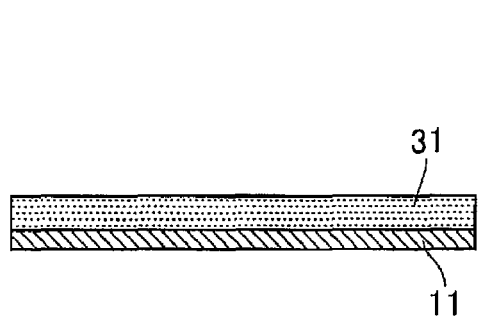
FIG. 10(a) to 10(g) illustrate each step in the method of forming the partition and the spacer of the electrophoretic display medium on the first substrate, as a second embodiment.
Figure 10D:
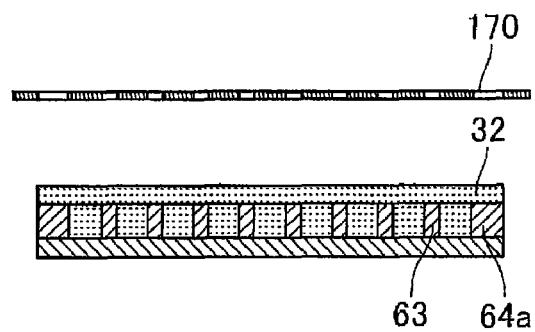
Figure 10B:
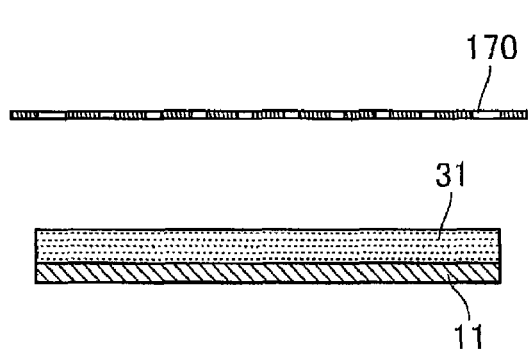
Figure 10E:
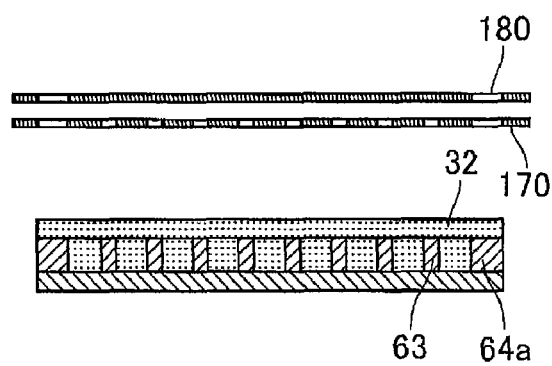
Figure 10C:
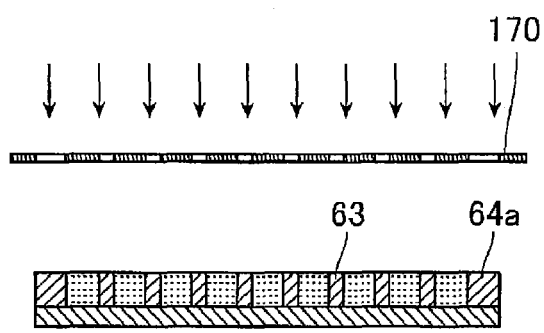
Figure 10F:
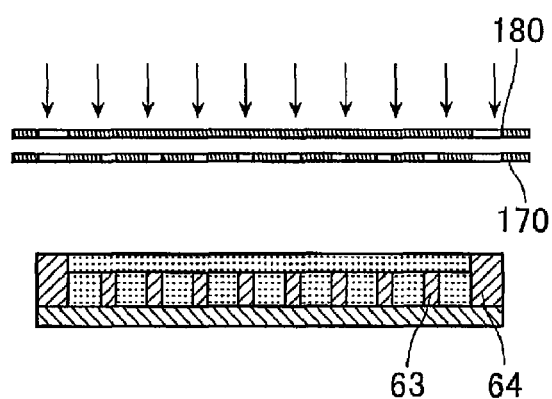
Figure 10G:
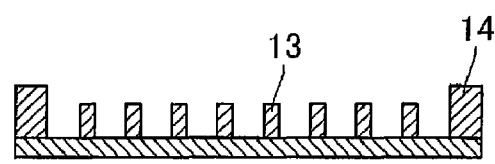

FIG. 10(a) to 10(g) illustrate each step in the method of forming the partition 13 and the spacer 14 on the first substrate 11 in the electrophoretic display medium 10, as the second embodiment of the present invention. FIG. 10(a) illustrates a first resist application step according to the present invention; FIG. 10(b) illustrates a first mask positioning step according to the present invention; FIG. 10(c) illustrates a first exposure step according to the present invention; FIG. 10(d) illustrates a second resist application step according to the present invention; FIG. 10(e) illustrates a second mask positioning step according to the present invention; FIG. 10(f) illustrates a second exposure step according to the present invention; and FIG. 10(g) illustrates a development step according to the present invention.

First, referring to FIG. 10(a), in the first resist application step, a first negative resist 31, which is a negative-type resist, is applied on the first substrate 11. The first negative resist 31 is applied on the first substrate 11 at a thickness of 20 μm by the spin-coating method. The first negative resist 31 applied on the first substrate 11 is then soft-baked until the first negative resist 31 becomes not sticky.

Next, referring to FIG. 10(b), in the first mask positioning step, a first mask 170 is positioned over the first substrate 11 in a state that the first mask 170 is distant from the first negative resist 31.

Figure 11:
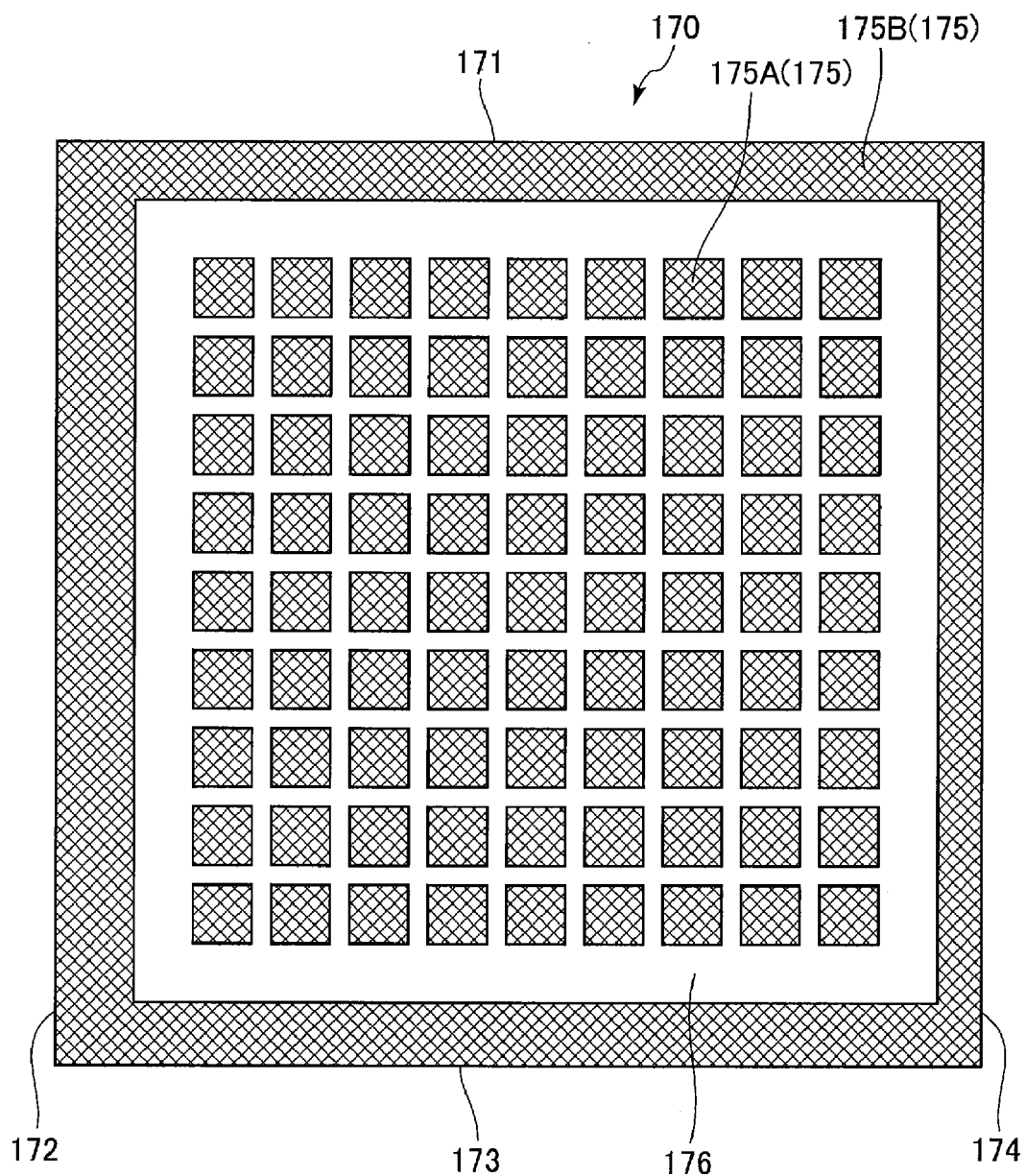
FIG. 11 is an elevation view showing a first mask.

Here, a description is given for the first mask 170 with reference to FIG. 11. FIG. 11 is an elevation view of the first mask 170. As shown in FIG. 11, for the first mask 170, printing is made on a glass plate with a light-shielding agent 175 (175A and 175B) so that an aperture pattern 176 is formed thereon. The aperture pattern 176 has a shape obtained by combining the lattice-shaped aperture pattern 146 formed on the first mask 140 according to the first embodiment, and the rectangular aperture pattern 156 formed on the second mask 150 according to the first embodiment. In the first mask 140 according to the first embodiment, among a plurality of light-shielding agents 145A, each of the light-shielding agents 145A disposed in the top and bottom rows as well as in the leftmost and rightmost columns are in contact with the light-shielding agent 145B. In the second embodiment, however, each of the light-shielding agents 175A disposed in the top and bottom rows as well as in the leftmost and rightmost columns is printed so as to keep a predetermined distance from the light-shielding agent 175B.

Next, referring to FIG. 10(c), in the first exposure step, the first negative resist 31 is exposed to light through the above-mentioned first mask 170. In this case, the amount of the light exposure is equal to 500 mJ/cm$^2$. A post exposure bake (PEB) is then performed on the first negative resist 31 so that a latent image 63 having the same shape as the partition 13 is formed. In this case, as mentioned above, the aperture pattern 176 on the first mask 170 according to the second embodiment has a shape obtained from the combination of the lattice-shaped aperture pattern 146 formed on the first mask 140 according to the first embodiment, and the rectangular aperture pattern 156 formed on the second mask 150 according to the first embodiment. Therefore, a latent image 64a, which is a part of the latent image 64, having the same shape as the spacer, is also formed in the first negative resist 31.

Next, referring to FIG. 10(d), in the second resist application step, a second negative resist 32, which is a negative-type resist, is applied on the first negative resist 31. The second negative resist 32 is applied on the first negative resist 31 at a thickness of 5 μm by the spin-coating method. The second negative resist 32 applied on the first negative resist 31 is then soft-baked until the second negative resist 32 becomes not sticky.

Next, referring to FIG. 10(e), in the second mask positioning step, without removing the first mask 170 from the first substrate 11, a second mask 180 is positioned over the first mask 170 so that the second mask 180 is positioned over the first substrate 11.

Figure 12:
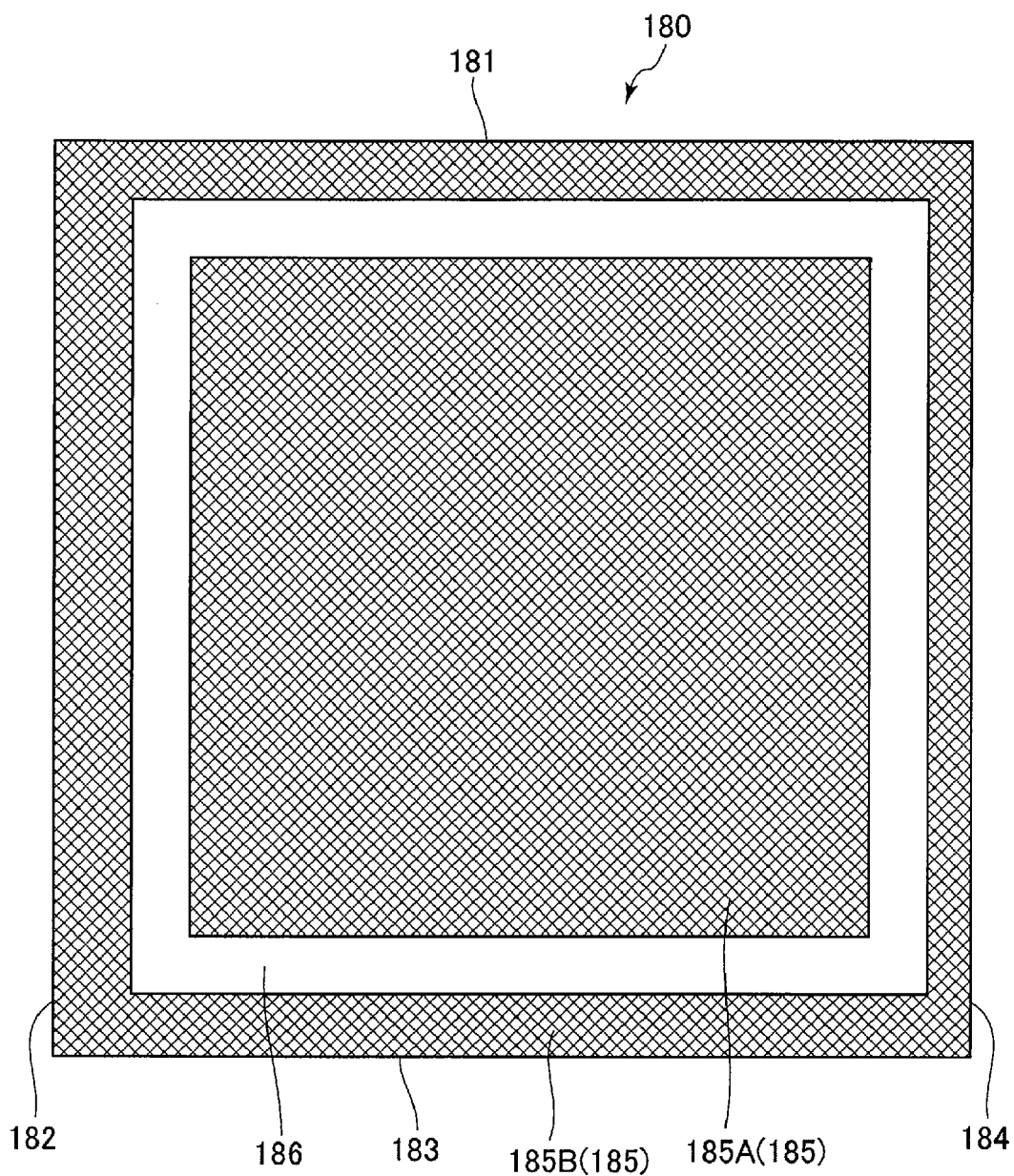
FIG. 12 is an elevation view showing a second mask.

Here, a description is given for the second mask 180 with reference to FIG. 12. FIG. 12 is an elevation view of the second mask 180. Similarly to the second mask 150 according to the first embodiment, for the second mask 180, printing is made on a glass plate with a light-shielding agent 185 (185A and 185B) so that a rectangular aperture pattern 186 is formed thereon as shown in FIG. 12.

Next, referring to FIG. 10(f), in the second exposure step, the second negative resist 32 is exposed to light through the above-mentioned second mask 180 and the first mask 170. A post exposure bake (PEB) is then performed on the second negative resist 32 so that the remainder of the latent image 64 is formed on the top surface of the latent image 64a. Therefore, similarly to the first embodiment, the latent image 64 having the same shape as the spacer 14 is formed on the first substrate 11.

Next, referring to FIG. 10(g), in the development step, a development is performed, with a developer, on the first negative resist 31 and the second negative resist 32, where the latent image 63 and the latent image 64 are formed. After that, the latent image 63 and the latent image 64 left on the first substrate 11 are sintered by post bake, thereby forming the partition 13 and the spacer 14 on the first substrate 11.

According to the second embodiment, since the first mask does not have to be removed in the second mask positioning step, the partition and the spacer can be formed efficiently.

Further, the methods of forming a partition and a spacer on a first substrate in an electrophoretic display medium of this invention, as well as an electrophoretic display medium manufactured according to the methods of forming a partition and a spacer on a first substrate in an electrophoretic display medium, are not confined to the embodiments described above, and it would be apparent to those skilled in the art that many modifications and variations may be made therein without departing from the spirit of the invention.

In the above embodiments, the average diameter of the charged particles 15 is 3 μm, the partition 13 is 20 μm high, and the spacer 14 is 25 μm high. However, the present invention is not limited to these values.

Further, in the above embodiments, neither the first substrate 11 nor the second substrate 12 of the electrophoretic display medium 10 directly includes an electrode for applying an electric field to the charged particles 15. However, the first substrate 11 and the second substrate 12 may include electrodes directly. If this is the case, as electrodes formed on the first substrate 11 and the second substrate 12, well-known electrodes, including a TFT electrode and a simple-matrix type electrode, may be employed.

Further, the above embodiments relate to the case in which the dispersion medium 16 has black charged particles 15 dispersed therein, but the color of the charged particles 15 dispersed in the dispersion medium 16 is not limited to black.

Further, in the above embodiments, the dispersion medium 16 having black charged particles 15 dispersed therein is dyed in white, but the dispersion medium 16 can be transparent, wherein white charged particles having the polarity opposite to the charged particles 15 are dispersed.

Figure 13:
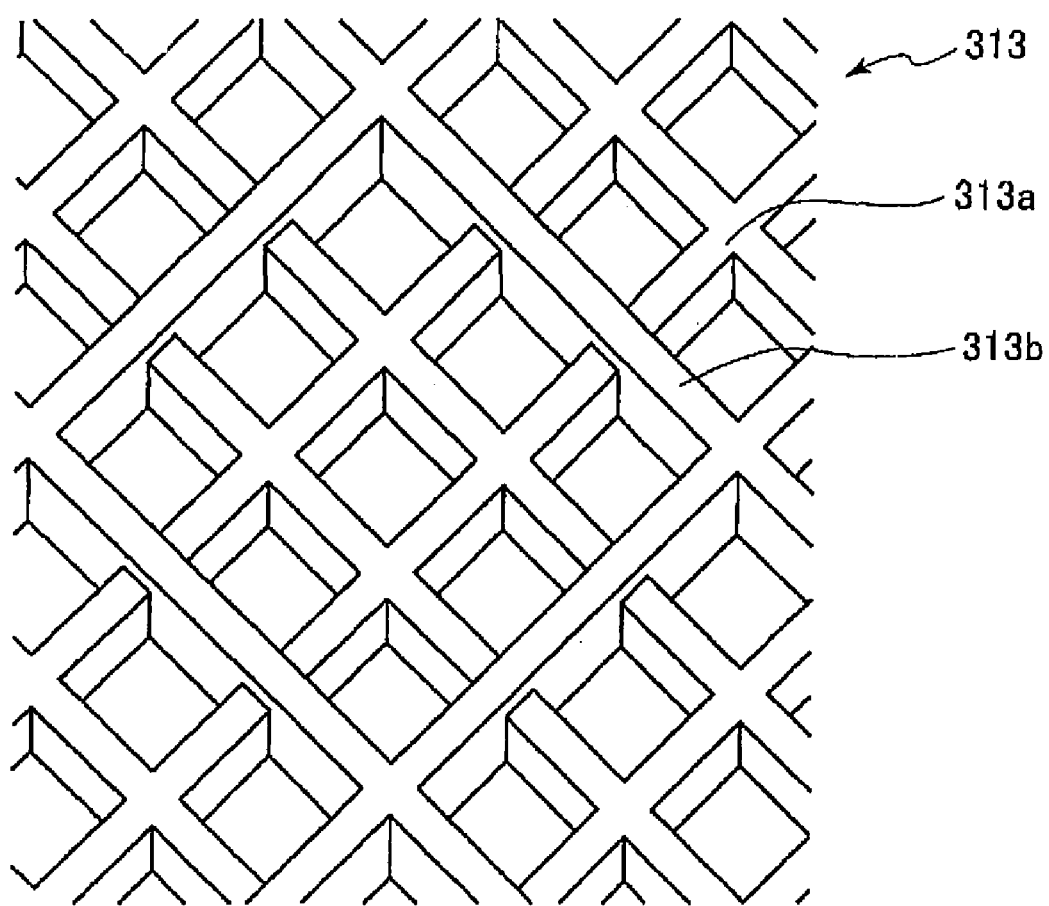
FIG. 13 is a perspective view showing one example of a partition formed so that part of the partition works also as a spacer.
Figure 14:
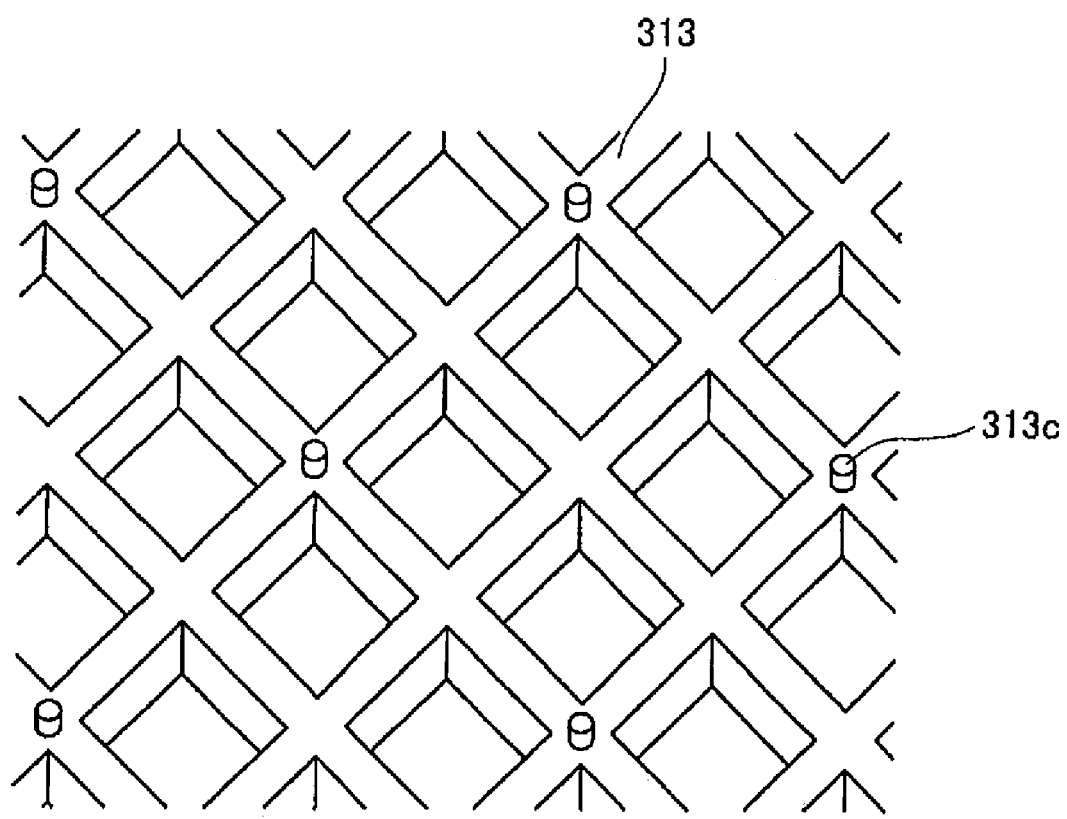
FIG. 14 is a perspective view showing one example of a partition formed so that part of the partition works also as a spacer.

Further, in the above embodiments, the spacer 14 is formed only in the outer regions of the first substrate 11 and the second substrate 12, but a part of the partition can be formed so as to be in contact with the second substrate 12 and thus used as a spacer for defining the distance between the first substrate 11 and the second substrate 12. FIG. 13 and FIG. 14 are perspective views showing a partition 313 formed so that a part of the partition works as a spacer. In FIG. 13, a lattice-shaped partition includes a lower partition 313a and a higher partition 313b. In FIG. 14, a plurality of columns 313c is provided on the partition 313 at a designated interval. Thus, the partition is not limited to a specific shape. Also in the above embodiments, while the partition is formed like a lattice shape as viewed from the first substrate side, it is also possible for the partition to have other shapes, such as polygons like a honeycomb, parallel lines or waves.

Further, in the second embodiment, the second mask 180 is positioned over the first mask 170 without removing the first mask 170 in the second mask positioning step. However, only the second mask 180 can be positioned over the substrate after removing the first mask 170 in the second mask positioning step. Also in the above-mentioned embodiments, the second substrate 12 is formed of transparent polyethylene terephthalate, thus the top surface of the second substrate 12 being used as a display region in the electrophoretic display medium 10. However, the first substrate 11 can be formed of transparent polyethylene terephthalate so that a surface of the first substrate 11 is employed as a display region.

Further, in the above embodiments, a liquid resist is employed in the first resist application step and the second resist application step, but the present invention is not limited to this type. For example, a dry-film type resist may be applied.

What is claimed is:

1. A method of forming an electrophoretic display medium, comprising:
   a first resist application step wherein a first negative resist is applied on a first substrate;
   a first exposure step wherein the first negative resist is exposed to light through a first mask having an aperture pattern through which a pattern of a partition is exposed to light;
   a second resist application step wherein a second negative resist is applied on the first negative resist;
   a second exposure step wherein the second negative resist and the first negative resist are exposed to light through a second mask having an aperture pattern through which a pattern of a spacer is exposed to light;
   a development step wherein the first negative resist and the second negative resist are developed to form the partition and the spacer on the first substrate;
   disposing the first substrate and a second substrate to confront with each other with the partition and the spacer interposed between the first substrate and the second substrate, the partition partitioning a region between the first substrate and the second substrate, the spacer defining a distance therebetween; and
   injecting a dispersion medium between the first substrate and the second substrate with charged particles dispersed therein.

2. The method according to claim 1, wherein an amount of the light exposure in the second exposure step is greater than an amount of the light exposure in the first exposure step.

3. The method according to claim 1, further comprising:
   a first mask positioning step wherein the first mask is positioned over the first substrate before executing the first exposure step; and
   a second mask positioning step wherein the second mask is positioned over the first substrate after removing the first mask from the first substrate before executing the second exposure step.

4. A method of forming an electrophoretic display medium, comprising:
   a first resist application step wherein a first negative resist is applied on the first substrate;
   a first exposure step wherein the first negative resist is exposed to light through a first mask having an aperture pattern through which patterns of a partition and a spacer are exposed to light;
   a second resist application step wherein a second negative resist is applied on the first negative resist;
   a second exposure step wherein the second negative resist is exposed to light through a second mask having an aperture pattern through which a pattern of the spacer is exposed to light;

a development step wherein the first negative resist and the second negative resist are developed to form the partition and the spacer on the first substrate;

disposing the first substrate and a second substrate to confront with each other with the partition and the spacer interposed between the first substrate and the second substrate, the partition partitioning a region between the first substrate and the second substrate, the spacer defining a distance therebetween; and injecting a dispersion medium between the first substrate and the second substrate with charged particles dispersed therein.

5. The method according to claim 4, further comprising:

a first mask positioning step wherein the first mask is positioned over the first substrate in a state that the first mask is distant from the first negative resist before executing the first exposure step; and a second mask positioning step wherein a second mask is positioned over the first substrate without removing the first mask from the first substrate before executing the second exposure step.

6. The method according to claim 4, further comprising:

a first mask positioning step wherein the first mask is positioned over the first substrate before the first exposure step; and a second mask positioning step wherein the second mask is positioned over the first substrate after removing the first mask from the first substrate before the second exposure step.

* * * * *